(12) United States Patent
Hecht et al.

(10) Patent No.: US 6,411,212 B1
(45) Date of Patent: Jun. 25, 2002

(54) TRANSPONDER ARRANGEMENT

(75) Inventors: Johannes Hecht, Neu-Ulm; Dietbert Kollbach, Esslingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/357,852

(22) Filed: Jul. 21, 1999

(30) Foreign Application Priority Data

Jul. 21, 1998 (DE) .......................................... 198 32 628

(51) Int. Cl.⁷ .............................................. G08B 13/14
(52) U.S. Cl. ................... 340/572.1; 340/505; 340/539; 340/10.1; 342/51
(58) Field of Search ............................ 340/505, 825.34, 340/426, 572.1, 572.5, 572.7, 539, 825.69, 825.31, 10.1, 10.2, 10.3, 10.34; 307/10.4, 10.5, 10.2, 10.42, 112, 113; 342/44, 51; 604/20

(56) References Cited

U.S. PATENT DOCUMENTS

| | | | | |
|---|---|---|---|---|
| 5,451,959 A | * | 9/1995 | Schuermann | 342/51 |
| 5,696,485 A | * | 12/1997 | Treharne | 340/505 |
| 5,923,763 A | * | 7/1999 | Walker et al. | 380/51 |
| 6,064,298 A | * | 5/2000 | Zimmer | 340/426 |
| 6,185,452 B1 | * | 2/2001 | Schulman et al. | 604/20 |

FOREIGN PATENT DOCUMENTS

| | | |
|---|---|---|
| DE | 36 43 236 | 7/1988 |
| DE | 39 28 573 | 3/1990 |
| DE | 39 09 301 | 10/1990 |
| DE | 195 01 004 | 11/1995 |
| DE | 195 07 721 | 9/1996 |
| EP | 0 442 390 | 8/1991 |
| EP | 0 521 547 | 1/1993 |
| GB | 1 213485 | 11/1970 |
| GB | 2 309598 | 7/1997 |

OTHER PUBLICATIONS

Copy of Office Action from the UK Patent Office dated Jan. 26, 2000.
*Elektronik* 19/1994 entitled "Das elektronische Etikett" by Helmuth Lemme, pp. 126–135.

* cited by examiner

*Primary Examiner*—Anh La
(74) *Attorney, Agent, or Firm*—Crowell & Moring LLP

(57) ABSTRACT

For a transponder arrangement having a transponder arranged on an object, in order to achieve longer ranges than would be possible with a purely field-supplied response mode, the transponder is provided with a chargeable electrical energy store. An inductive supply of energy from a pump circuit situated on the object is used to hold the energy store in a charged state. The transponder arrangement can advantageously be interrogated not only in the active mode now made possible, but also in a passive mode which is known per se and is supplied with power purely by the interrogation field.

30 Claims, 3 Drawing Sheets

TRANSPONDER ARRANGEMENT

BACKGROUND AND SUMMARY OF THE INVENTION

This application claims the priority of German Application No. 198 32 628.9, filed Jul. 21, 1998, the disclosure of which is expressly incorporated by reference herein.

The invention relates to a transponder arrangement wherein a transponder is arranged on an object.

Transponders are particularly used for distinguishing objects for identification and/or authentication with regard to contactless interrogation, particularly using an electromagnetic field from an interrogation unit. In addition to use in automation technology, a significant area of application is in vehicles, for example for recording traffic or detecting improper use of a vehicle, particularly after a theft.

German Patent document DE 195 07 721 C2 discloses an arrangement having a passive transponder which, during interrogation by an electromagnetic near field from an interrogation unit at a different frequency, returns a response signal to the interrogation unit. In doing so, the transponder accepts the energy for operating the transponder electronics from the interrogation field. An antenna loop, which is large relative to the transponder body, is coupled to the transponder by means of a coupling coil for bidirectional data transfer and can be arranged so as to be remote from it. However, the transponder can be operated only in an area where the field strength of the interrogation field is high, and can therefore be operated only at a short distance from the interrogation unit.

A transponder arrangement which draws power from the interrogation field is also described in European Patent document EP 0 44 23 90 A1. German Patent document DE 39 28 573 A1 describes a field-supplied transponder device with a voltage comparator which detects the voltage of the rectified received signal and activates a response circuit only if a voltage threshold has been exceeded.

The article, Electronik 19/1994, pages 126 to 135, describes various transponder technologies, the transponders being fitted with electrochemical primary elements, in particular lithium batteries, for systems which have a relatively long range and/or relatively complex electronic circuits including data encryption. However, on account of their limited lifetime and temperature sensitivity, such primary elements cannot be used for all applications. During interrogation, similarly described systems operating in half-duplex mode are supplied with energy for transmission operation by the interrogation field or a separate external field with a different frequency and can have an energy store in the form of a capacitor. However, to charge the capacitor, the transponder needs to remain in the field from the interrogation unit for a sufficient time period. German Patent document DE 39 09 301 A1 discloses a circuit arrangement for such a transponder device, which monitors the charge state of the storage capacitor and, if the charge is sufficient, activates the responder in the transponder device, said responder being supplied with power by the storage capacitor.

European Patent document EP 0 521 547 A1 discloses a system for preventing the theft of a vehicle, in which a vehicle arrangement communicates with a portable arrangement on two frequency bands which are a long way apart. The vehicle arrangement is powered by the vehicle power supply, whilst the portable arrangement is powered by an integrated battery.

German Patent document DE 36 43 236 A1 describes a transponder arrangement in the form of a personal protection radio transceiver with a chargeable accumulator. The movement of the unit during operation actuates a mechanical/inductive converter whose induced voltage, after rectification, is used for charging the accumulator.

German Patent document DE 195 01 004 A1 also discloses a system in which a purely inductively field-supplied transponder arrangement contains circuits with cryptological capabilities. However, the distance between the interrogation unit and the transponder arrangement is very small in this case. This system is typically provided for authenticating an electronic ignition key in an ignition lock.

There is therefore needed a transponder arrangement of the above-mentioned type which is operable over a long range even with only short residence times in an interrogation field and without a dedicated primary power source.

These needs are met according to the invention by a transponder arrangement having a transponder which is arranged on an object and contains a chargeable electrical energy store from which the transponder draws electrical power at least for a transmission operating mode, characterized in that the object additionally has a pump circuit arranged on it. At least intermittently, the pump circuit charges the energy store.

In the arrangement according to the invention, the transponder always contains an energy reserve calculated to be high enough to be able to emit a response signal, in response to an interrogation for a short transmission interval (which generally lasts only for a few milliseconds) at a high transmission power and thus with a long range. Since charging the internal energy store does not involve the use of the external field from an interrogation unit, the transponder arrangement can also be situated a relatively long way from an interrogation unit and does not need to remain in the field from the interrogation unit for very long.

In one advantageous embodiment of the invention, the internal energy store allows for a complex processor operating at a high clock frequency, for example a cryptoprocessor, to also be provided in the transponder and supplied by the energy store as required. In addition, the provision of an internal energy store makes it possible to implement even technologies which use a relatively large amount of power, and particularly to group different technologies within a transponder, for example in the shape of the transmission stage design using GaAs technology for emitting a response signal in the gigahertz range.

For many applications, it may be advantageous to subdivide the transponder electronics into more complex control electronics and a wake-up circuit which is of simple design and uses little power. The control circuit then generally is in the no-output idle state and an interrogation signal first activates the wake-up circuit. The control circuit is then supplied with power from the energy store and activates it for handling the dialogue with an interrogation unit.

Preferably, in addition to the transmission mode, which is supplied by the energy store and has a long range and/or uses a cryptoprocessor and/or uses different technologies and the like, a passive mode of the type which is customary per se in purely field-supplied transponders is also provided for the transponder. This is so that, depending on the operating state of the object, for example a vehicle, operation of the transponder from the energy store can also be inactive and the transponder can be interrogated only in the conventional manner of a purely passive field-supplied transponder. Such a change between different operating modes is advantageous for a motor vehicle, for example, in which long-range high-speed interrogation can be dispensed with in the parked state. This is because the vehicle is obviously not moving at a relatively high speed through a remotely arranged interrogation unit in this state. Thus, interrogation from a short distance, for example by a manually operated interrogation unit, avoids simultaneous response from a large number of transponders when there is a relatively large number of closely parked vehicles. The transponder then responds passively to such a near field from an interrogation unit.

A particularly advantageous feature is the inductive coupling between the pump circuit arranged on the object and the transponder via a coupling coil of the transponder. With this, use may advantageously be made of the fact that known transponders also have such a coupling coil which they use to couple to the external field or preferably to an antenna coil which has a relatively large area and primarily accepts the external interrogation field and emits the response signal. The intermediate circuit in a separate antenna coil also makes it possible to accommodate the transponder such that it is hidden and largely secured against manipulation and destruction. Examples of energy stores which may be considered are accumulators in the form of chemical secondary elements or preferably capacitors, in particular solid-electrolyte capacitors.

According to a first embodiment, the pump circuit, which is supplied by an object's dedicated power source, can apply a low power to the energy store of the transponder continuously. By way of example, the further acceptance of energy by the energy store in the fully charged state can then be limited by the charge voltage reached and/or an electronic charge limiting circuit and/or by deliberate consumption of a small amount of electrical power in a non-reactive resistor. So as not to impede operation of the transponder, the transponder is charged continually, advantageously at a frequency which is sufficiently different from the operating frequencies of the transponder, in particular a lower frequency. The supplied pump power and an external interrogation field can then be isolated simply using frequency-selective means, for example a low-pass filter in the supply line to the energy store.

Other procedures provide for the pump circuit to charge the energy store of the transponder merely as required, querying and assessment of the charge state of the energy store being possible in the transponder. When charging is required, the first possibility is for the transponder independently to transmit a charge request signal to the pump circuit. Upon receipt of the request signal, the latter starts a charging process. Alternatively or in addition to this, the pump circuit can direct a charge requirement enquiry to the transponder at regular time intervals, or a charging process can be initiated without a request. If the charging process is not compatible with simultaneous transponder operation, it is advantageous to keep the time for charging the energy store short and to design it for example as very short, power-intensive charging intervals which do not last as long as the regular period that follows such charging intervals. The timing ratio of the charging interval to the period that follows the interval is then advantageously less than 0.01, in particular less than 0.001.

A further embodiment provides for charging the energy store to be distinguished from transponder operation by a special charging telegram. This special charging telegram either fundamentally places the transponder into a charging state for the energy store or, for initiating the charging process, can be confirmed to the pump circuit by a charge acceptance telegram from the transponder. In the first case, the charging process essentially has priority. In the second case, the transponder operation can be given priority or, for a more complex decision, the charge state of the energy store can also be taken into account for accepting or rejecting a charging process. If the charging process has priority over transponder operation, the transponder may advantageously be designed such that it switches back to normal mode after a specific time or detects the end of the charging process in another way or receives a special end-of-charging signal from the pump circuit, and/or such that the transponder terminates the charging process by sending an end-of-charging telegram to the pump circuit.

In the arrangement according to the invention, the transponder can advantageously operate in full-duplex mode and thus derive the transmission and/or clock frequency of a response signal from the transmission and/or clock frequency of the interrogation signal. This can be done without a dedicated frequency standard. This property is also advantageous, in particular, for purely passive operation in the near field from an interrogation unit.

Other objects, advantages and novel features of the present invention will become apparent from the following detailed description of the invention when considered in conjunction with the accompanying drawings.

DETAILED DESCRIPTION OF THE DRAWINGS

Figure 1:
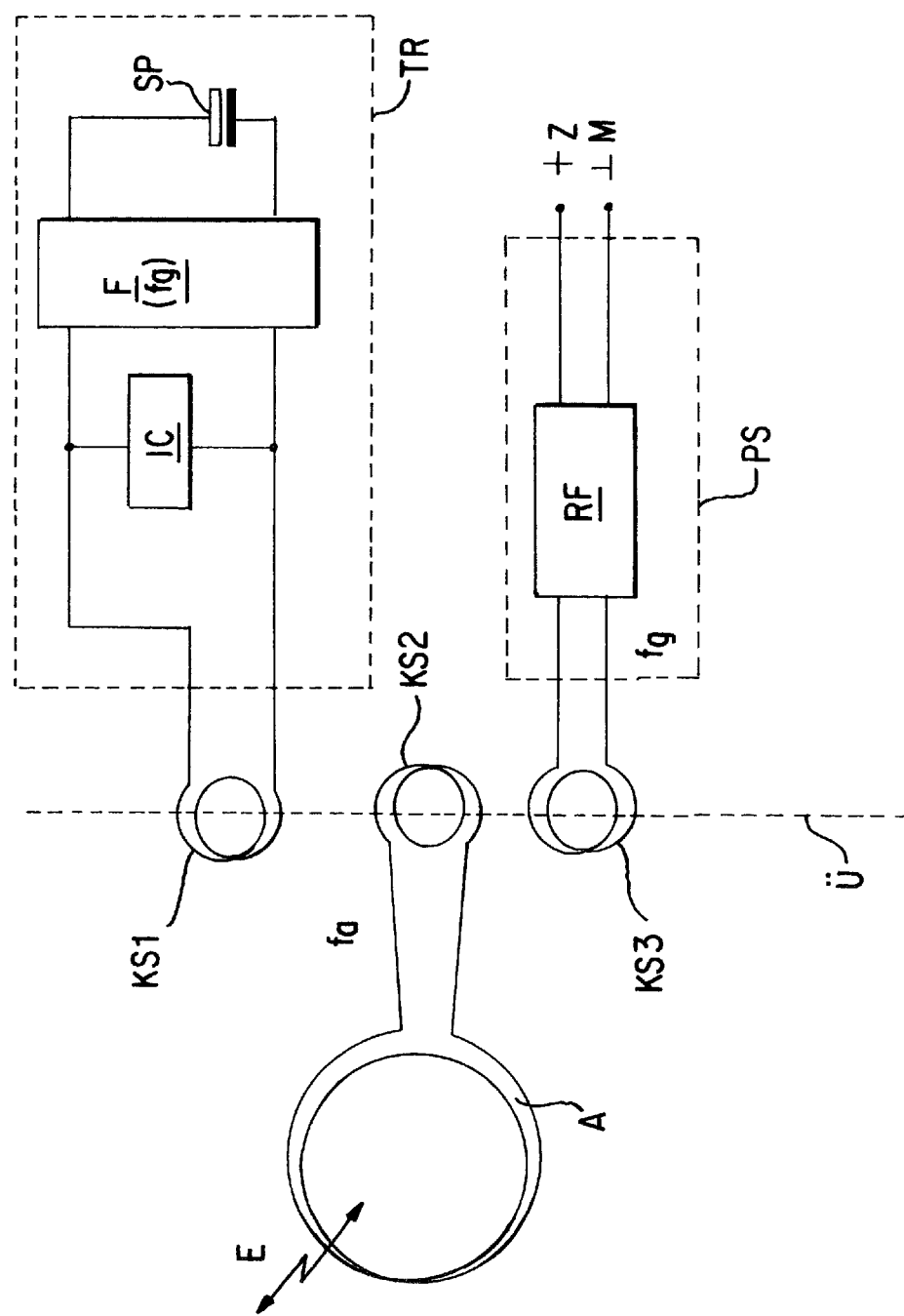
FIG. 1 is a schematic diagram of an embodiment according to the present invention with continuous charging.

In the arrangement shown in FIG. 1, a transponder TR having a first coupling coil KS1, a large-area loop antenna A having a second coupling coil KS2, and a pump circuit PS having a third coupling coil KS3 are coupled to one another inductively in a transformer Ü (which is indicated by a broken line). The inductive coupling of the field antenna A to the transponder TR using coupling coils is known per se from the prior art mentioned above and is in common use.

The pump circuit PS is connected via connection terminals Z and M to an object's dedicated power source, for example the battery of a vehicle. The pump circuit PS produces a pump signal having the frequency $f_g$ using a radio-frequency generator RF. This charging frequency $f_g$ is different from the operating frequency $f_a$ of an external interrogation field as well as possibly other operating frequencies of the transponder. In particular, the charging frequency $f_g$ is lower than the operating frequency $f_a$. The pump circuit charging signal that is coupled into the transponder via the transformer and the coupling coils KS3 and KS1 is isolated, in the transponder, from an interrogation signal by means of a frequency-selective circuit F which can be a simple low-pass filter circuit for $f_g < f_a$, rectified and supplied to the energy store SP to charge it. This avoids the interrogation signal being attenuated at the operating frequency $f_a$ as a useful signal because no useful signal power flows away to the energy store.

The path to the transponder electronics may be provided with frequency-selective means which prevent the transponder electronics from being subjected to the charging signal with the frequency $f_g$. If an interrogation signal is produced across the antenna loop A and the coupling coils KS2 and KS1 of the transformer, this signal being detected by the transponder electronics IC, the transponder electronics IC draw power from the energy store SP to produce a response signal which is emitted to the interrogation unit via the coupling coils and the antenna loop A.

Operation of the RF generator to produce a pump circuit charging signal can be restricted to the operating state of a vehicle with the ignition switched on, as already described. When the ignition is switched off, the energy store SP will generally be discharged after some time and the transponder electronics IC then operate purely passively, i.e. they draw their power for a response signal solely from the interrogation field of an external interrogation unit.

Figure 2:
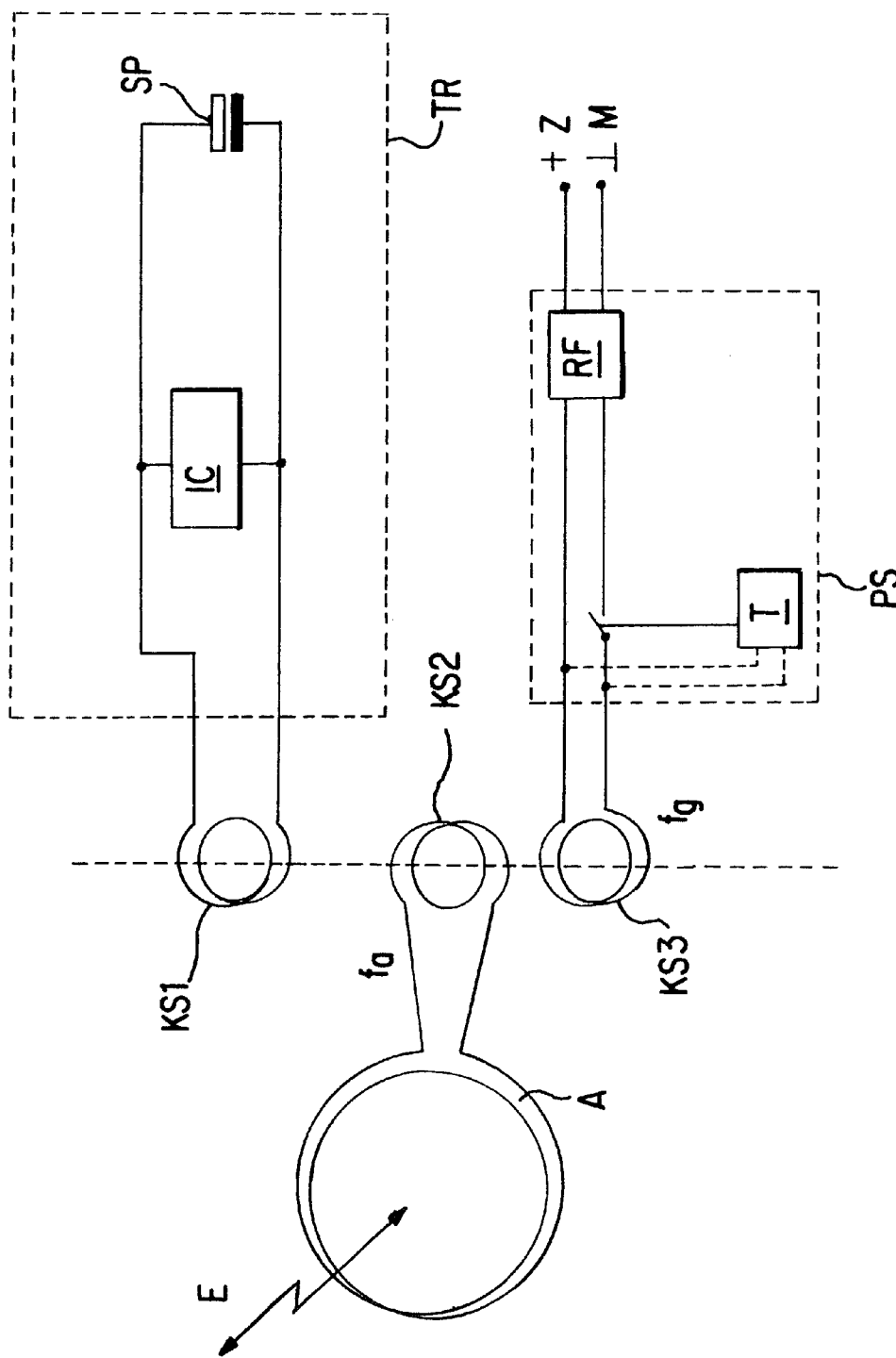
FIG. 2 is a schematic diagram of another embodiment according to the present invention with charging at intervals.

In the arrangement shown in FIG. 2, the pump circuit PS is provided with a clock-signal generator T which, at specific time intervals only, connects the charging signal generator RF to the coupling coil KS3 in order to transfer power to the transponder TR. The logic circuit can initiate a charging process at regular time intervals, for example. Provided that the charging interval is shorter than the time that follows charging intervals, distinct separation of the charging frequency $f_g$ from the operating frequency $f_a$ can be dispensed with (elimination of F in FIG. 1), and, in particular, the two frequencies can even have the same magnitude. The transponder then no longer has the frequency-selective circuit F for isolating the charging signal from the interrogation signal. In the transponder, the charging signal can be distinguished from an interrogation signal, for example, owing to the presence of a particular charging signal identifier or owing to the absence of a particular interrogation signal identifier.

The charging processes at successive intervals whose time intervals are not necessarily the same but may also depend on various operating parameters can be started irrespective of requirements, or the need for charging is first established by means of an interrogation telegram from the pump circuit PS to the transponder TR and a response signal from the latter, or by means of a request signal from the transponder TR. In the design with an enquiry signal from the pump circuit PS to the transponder TR, provision may also be made for the energy store state of the transponder to be interpreted as being empty if there is no response signal from the said transponder, and for a charging process then to be started anyway. A continuous charging process can be terminated when a specific charge state of the energy store is reached, in which case the charge state of the energy store can be checked by a detector circuit in the transponder or in the pump. With a transponder detector circuit, an end-of-charging signal is transmitted to the pump circuit to do this. For this purpose, the logic circuit T is connected to the supply line for the coupling coil KS3 by means of monitoring lines.

If the charging signal and an external interrogation signal have the same frequencies, at least approximately, the transponder TR cannot generally be interrogated and read via the field coil A during a charging process. To impair transponder operation as little as possible, the length of a charging interval is advantageously selected to be very small in comparison with the time that follows charging intervals, and is on average typically less than 1%, particularly less than 0.1%, of the total operating time. To prevent the transponder electronics IC from reacting to a charging signal, the charging signal interval can, for example, be below a reaction time threshold of the transponder electronics and/or can have a particular charging signal identifier.

Figure 3:
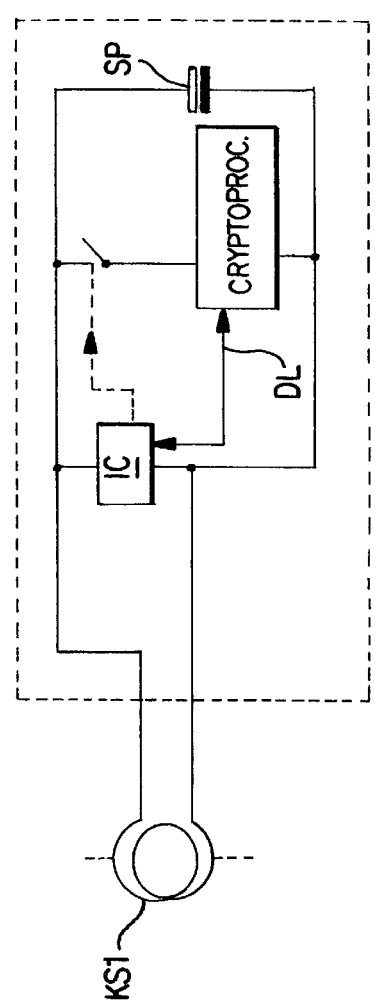
FIG. 3 is a schematic diagram of a transponder with an additional processor.

In the embodiment shown in FIG. 3, the transponder TR contains an additional complex processor 10, for example a cryptoprocessor for data encryption, error correction or the like. The processor 10 cannot be operated merely by power drawn from an interrogation field but is dependent on power supplied from the energy store SP. The transponder TR is then advantageously designed such that the processor 10 is generally isolated from the energy store SP by an electronic switch 12, and only after an interrogation signal has been detected by the transponder electronics IC is the switch 12 closed and the processor 10 activated. The initial activation of the processor 10 can additionally be made dependent on the charge state of the energy store SP, so that if the charge state is too low, the transponder electronics IC operate only in the passive mode without the additional processor 10. Separate data lines DL can be provided between the transponder electronics IC and the cryptoprocessor 10.

The advantageous possibility, already described, for the transponder to be able to operate both in a transmission operating mode, which is supplied by the energy store SP and has a long range and/or additional complex electronics and/or a transmission circuit using a technology which consumes more power, and the like, on the one hand, and in a passive operating mode supplied purely by the field from an interrogation unit, applies invariably to all the embodiments described above.

Figure 4:
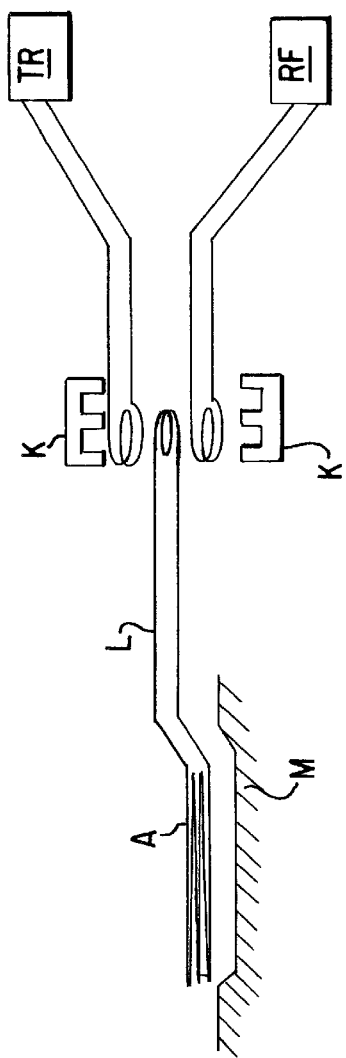
FIG. 4 illustrates an example of the design of a transponder arrangement according to the invention.

In the arrangement shown in FIG. 4, the antenna loop A is accommodated, with mechanical protection, in a hollow M formed in a surface of the object. The antenna loop A is connected to the associated coupling coil KS2 by means of a supply line L. The plurality of coupling coils KS1, KS2 and KS3 for the transponder TR, the field coil A and the pump circuit PS are coupled to one another inductively in a transformer arrangement. The transformer arrangement can advantageously contain a ferrite core K, for example in the form of an annular, E-shaped or U-shaped core, to enhance the coupling. The physical isolation of the antenna coil A and the transponder TR with the inductive coupling in the transformer can, advantageously and as is known per se, jointly fulfill the requirements for the antenna coil A to be positioned so as to favour interrogation and for the transponder TR to be accommodated so as to be secure from manipulation and destruction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transponder arrangement for an object having a dedicated power source to operate the object, comprising:

a transponder arranged on said object and configured to communicate with an external interrogation unit, the transponder including a chargeable electrical energy store from which electrical power is drawn for the transponder at least for a transmission operating mode;

a pump circuit arranged on said object and coupled to said dedicated power source used to operate said object, the pump circuit producing a charging signal used to transfer energy during a charging process via an inductive coupling to the chargeable electrical energy store of the transponder without using an external field of the interrogation unit;

a pump circuit coupling coil connected to the pump circuit;

a transponder coupling coil coupled to the transponder, wherein the inductive coupling used to transfer energy between the pump circuit and the chargeable electrical energy store is carried out via the pump coupling coil and the transponder coupling coil.

2. The arrangement according to claim 1, wherein the transponder coupling coil operates to both charge the energy store and to communicate with the external interrogation unit.

3. The arrangement according to claim 2, further comprising an antenna loop associated with the object, wherein the transponder coupling coil is inductively coupled with the antenna loop.

4. The arrangement according to claim 3, further comprising a transformer, the transformer coupling the transponder coupling coil with at least one of the pump coupling coil and the antenna loop.

5. The arrangement according to claim 1, wherein the pump circuit produces a charging signal and the transponder has an operating frequency or frequencies, a charging frequency of the pump circuit charging signal being different from the operating frequency or frequencies of the transponder.

6. The arrangement according to claim 5, further comprising a frequency-selector in the transponder for blocking a signal path to the energy store of signals at the operating frequencies of the transponder.

7. The arrangement according to claim 1, further comprising the external interrogation unit which generates an operating frequency for transponder operation, wherein a charging frequency of a charging signal produced by the pump circuit is the same as the operating frequency of the external interrogation unit.

8. The arrangement according to claim 1, wherein the energy transfer in a charging process of the energy store is operated only as required.

9. The arrangement according to claim 8, wherein the pump circuit queries a charge state of the energy store at regular intervals and conducts the energy transfer to the energy store when required.

10. The arrangement according to claim 8, wherein the transponder transmits a charge request signal to the pump circuit if a charge state of the energy store falls below a predefined threshold.

11. The arrangement according to claim 9, wherein the transponder transmits a charge request signal to the pump circuit if a charge state of the energy store falls below a predefined threshold.

12. The arrangement according to claim 1, wherein the energy transfer occurs regularly independent of any charge state requirements of the energy store.

13. The arrangement according to claim 12, wherein in the regular charging process, a length of the charging process is shorter than a time interval between successive charging processes.

14. The arrangement according to claim 1, wherein in addition to the transmission operating mode supplied with energy by the energy store, a passive operating mode of the transponder is supplied with energy by a field from the external interrogation unit.

15. The arrangement according to claim 1, further comprising an encrypted data communication device arranged in the transponder.

16. The arrangement according to claim 15, wherein the device is a cryptoprocessor.

17. The arrangement according to claim 1, wherein the transponder operates in a simultaneous transmission/reception mode.

18. The arrangement according to claim 17, wherein a transmission frequency of the transponder is derived from a frequency of an interrogation signal.

19. The arrangement according to claim 1, wherein the transponder includes transmission and reception circuitry, said circuitry being of different technologies and operating in different frequency bands.

20. The arrangement according to claim 1, further comprising a wake-up circuit arranged in the transponder.

21. The arrangement according to claim 1, wherein the chargeable electrical energy store is one of an accumulator and capacitor.

22. The arrangement according to claim 1, wherein the chargeable electrical energy store is a solid-electrolyte capacitor.

23. A method of operating an arrangement having a transponder with a chargeable electrical energy store on an object having a dedicated power source to operate the object, the method comprising the acts of:

supplying the transponder with electrical power from the electrical energy store at least for a transmission operating mode in which the transponder communicates with an external interrogation unit;

charging the electrical energy store via an inductive coupling of energy from a pump circuit coupleable to said dedicated power source used to operate said object using a pump coupling coil and a transponder coupling coil, without using an external field of the interrogation unit.

24. The method according to claim 23, further comprising the act of operating the transponder coupling coil both for charging the energy store and for communicating with the external interrogation unit.

25. The method according to claim 23, further comprising the act of using a charging frequency of a charging signal of the pump circuit that is different from an operating frequency of the transponder.

26. The method according to claim 23, further comprising the act of blocking a signal path to the energy store for signals at operating frequencies of the transponder.

27. The method according to claim 23, further comprising the act of using a charging frequency of a charging signal of the pump circuit which is the same as an operating frequency of the external interrogation unit for externally interrogating the transponder.

28. The method according to claim 23, wherein the charging process further comprises the acts of:

querying a charge state of the energy store via the pump circuit at regular intervals; and charging the energy store via the pump circuit based on results of the queries.

29. The method according to claim 23, wherein the charging process further comprises the act of transmitting a charge request signal from the transponder to the pump circuit if a charge state of the energy store falls below a predefined threshold value.

30. The method according to claim 23, further comprising the act of operating the charging process act at intervals having a length less than time intervals between successive charging processes.

* * * * *